United States Patent
Nelson et al.

(10) Patent No.: US 12,346,971 B2
(45) Date of Patent: *Jul. 1, 2025

(54) INFORMATION SHARING PORTAL ASSOCIATED WITH MULTI-VENDOR RISK RELATIONSHIPS

(71) Applicant: HARTFORD FIRE INSURANCE COMPANY, Hartford, CT (US)

(72) Inventors: Keith L Nelson, Parkland, FL (US); Pamela M. Bloom-Pugliese, Dive, FL (US); Paul William Leach, Miami, FL (US); Adele Spallone, Fort Lauderdale, FL (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 227 days.

This patent is subject to a terminal disclaimer.

(21) Appl. No.: 18/186,341

(22) Filed: Mar. 20, 2023

(65) Prior Publication Data

US 2023/0230042 A1   Jul. 20, 2023

Related U.S. Application Data

(63) Continuation of application No. 16/368,029, filed on Mar. 28, 2019, now Pat. No. 11,636,546.

(51) Int. Cl.
*G06Q 40/08* (2012.01)
*G06Q 10/1057* (2023.01)
*G06Q 30/0282* (2023.01)

(52) U.S. Cl.
CPC ......... *G06Q 40/08* (2013.01); *G06Q 10/1057* (2013.01); *G06Q 30/0282* (2013.01)

(58) Field of Classification Search
CPC . G06Q 40/08; G06Q 10/1057; G06Q 30/0282
See application file for complete search history.

(56) References Cited

U.S. PATENT DOCUMENTS

2006/0047537 A1* 3/2006 Brimdyr ............... G16H 40/20
705/2

\* cited by examiner

*Primary Examiner* — Christine M Behncke
*Assistant Examiner* — Henry H Jung
(74) *Attorney, Agent, or Firm* — Buckley, Maschoff & Talwalkar LLC

(57) ABSTRACT

A multi-vendor risk relationship data store may contain electronic records representing a plurality of risk relationships between multiple vendors and an enterprise and, for each risk relationship, an electronic record identifier and a set of attribute values. An information sharing portal computer server may exchange an information request with a remote vendor platform. The information request may be, for example, associated with an employee of a sponsor associated with the vendor platform. The server may process the information request via a customized vendor-specific information sharing portal interface display and execute an algorithm to adjust, based on at least one attribute value, interactions with the vendor platform via the portal interface display. The server may also aggregate information associated with a plurality of vendor platforms and transmit the aggregated information to a remote administrator device associated with the enterprise.

18 Claims, 20 Drawing Sheets

INFORMATION SHARING PORTAL: CLAIM DATA

Client Name: Test Corp.  Last Name: SMITH  First Name: Jane
SSN: xxx-xx-xxxx  Employee ID: xxxxx  Date of Birth: 1/1/2000
Most Recent: 1/1/2020  Contact: (xxx) xxx-xxxx  Age: 20

CLAIM DATA
Claim Number: xxxxxxx  Claim Status: Open  Owner: Intake
Product: STD  Reported: xx/xx/xxxx  520

ELIGIBILITY DATA
Date of Disability: xx/xx/xxxx  Hospitalized: ☑  Days: 7
Plan ID: Test STD Plan  Description: Arm  530

PROVIDER DATA  Name:  Specialty:

CLINICAL DATA  ICD: xxxx.x  CPT: xxx  540

BACK  NEXT

FIG. 5

INFORMATION SHARING PORTAL: CONTACT INFORMATION

Client Name: Test Corp.    Last Name: SMITH         First Name: Jane
SSN: xxx-xx-xxxx           Employee ID: xxxxx       Date of Birth: 1/1/2000
Most Recent: 1/1/2020      Contact (xxx) xxx-xxxx   Age: 20

— 610

CONTACT INFORMATION

Verified home address and telephone number? ☑

Was employee directed to communicate changes to employer? ☑

What is your relationship to employer? [Select ▼]

Last Name: _____   First Name: _____   Phone No.: _____
Street Address: _____   City: _____   State: [CT ▼]

620

BACK — 680

NEXT — 690

INFORMATION SHARING PORTAL: CREATE REQUEST

Send Request To: VENDOR CASE MANAGEMENT

Request Type: NEED TREATMENT NOTES

Request Details: CAN YOU PLEASE PROVIDE US WITH A COPY OF THE PATIENT'S TREATMENT NOTES? THANK YOU.

Attach Medical Release: ☑

SAVE    CANCEL

INFORMATION SHARING PORTAL: CLAIM HANDLER RECORDS

| | | | | | |
|---|---|---|---|---|---|
| ☑ | Vendor Portal Request Document | 1/18/2022 | Closed | 1/18/2022 13:01:34 PM | Imaging Client | 1234567 |
| ☑ | Vendor Portal Request Document | 1/18/2022 | Closed | 1/18/2022 13:33:34 PM | Imaging Client | 1234592 |
| ☑ | Vendor Portal Request Document | 1/18/2022 | Closed | 1/18/2022 13:51:34 PM | Imaging Client | 1234605 |

DENY — 980

APPROVE — 990

INFORMATION SHARING PORTAL: NEW REFERRAL

Referral To: Disability

Referral Type: Contact Employee to Initiate New Claim

Notes/Comments: WE THINK THIS PATIENT MAY BE A GOOD CANDIDATE FOR THE NEW HEALTHY LIVING PROGRAM.

SUBMIT — 1580

CANCEL — 1590

FIG. 15

| REQUEST ID 1902 | VENDOR IDENTIFIER 1904 | PROGRAM IDENTIFIER 1906 | DESCRIPTION 1908 | STATUS 1910 |
|---|---|---|---|---|
| 12345 | V_101 | P_1234 | INFORMATION REQUEST | OPEN |
| 67890 | V_101 | P_101 | REFERRAL | CLOSED |
| 87654 | V_102 | P_4321 | REFERRAL | OPEN |
| 19283 | V_103 | P_101 | INFORMATION REQUEST | OPEN |

INFORMATION SHARING PORTAL ASSOCIATED WITH MULTI-VENDOR RISK RELATIONSHIPS

CROSS-REFERENCE TO RELATED APPLICATIONS

The present application is a continuation of U.S. patent application Ser. No. 16/368,029 entitled "INFORMATION SHARING PORTAL ASSOCIATED WITH MULTI-VENDOR RISK RELATIONSHIPS" and was filed Mar. 28, 2019. The entire contents of this application are incorporated herein by reference.

BACKGROUND

An enterprise might enter into risk relationships associated with an entity (e.g., as a form of risk management). For example, an insurer might issue insurance policies (e.g., short-term disability insurance policies, long-term disability policies) in connection with an employer and a set of employees. In some cases, the risk relationships may include agreements implemented or administered by multiple vendors (e.g., medical providers). In some cases, the enterprise may want to accurately populate and/or utilize the content of one or more electronic records that represent those risk relationships. For example, more accurate electronic records may improve the performance of the enterprise by reducing errors (and the need to re-enter information), facilitate communication between parties, help locate appropriate resources, etc. Note that improving the accuracy of electronic records may result in substantial improvements to the operation of a network (e.g., by reducing an overall number of electronic messages that need to be created and transmitted via various networks or improving response times). Manually updating electronic records and associated documents, however, can be time consuming and expensive—especially when a substantial number of electronic records (e.g., associated with a large number of vendors or employees) and/or a wide range of different types of information that needs to be tracked and/or exchanged.

In some cases, an enterprise might use telephone calls and email messages to communicate with multiple vendors and employees. Such an approach, however, can require excessive and repetitive manual input, miss key business functionalities, and allow for minimal or no system integration to help utilize the data efficiently. Moreover, it can be difficult to aggregate and analyze information about multiple vendors, employers, etc. It would be desirable to provide systems and methods to facilitate the use and analysis of multi-vendor electronic record information and messaging in a way that provides faster, more accurate results.

SUMMARY OF THE INVENTION

According to some embodiments, systems, methods, apparatus, computer program code and means are provided to facilitate an exchange of information via an information sharing portal computer server of an enterprise. A multi-vendor risk relationship data store may contain electronic records representing a plurality of risk relationships between multiple vendors and an enterprise and, for each risk relationship, an electronic record identifier and a set of attribute values. An information sharing portal computer server may exchange an information request with a remote vendor platform. The information request may be, for example, associated with an employee of a sponsor associated with the vendor platform. The server may process the information request via a customized vendor-specific information sharing portal interface display and execute an algorithm to adjust, based on at least one attribute value, interactions with the vendor platform via the portal interface display. The server may also aggregate information associated with a plurality of vendor platforms and transmit the aggregated information to a remote administrator device associated with the enterprise.

Some embodiments comprise: means for exchanging, at an information sharing portal computer server, an information request with a remote vendor platform, the information request being associated with an employee of a sponsor associated with a vendor platform; means for accessing a multi-vendor risk relationship data store containing electronic records representing a plurality of risk relationships between multiple vendors and an enterprise and, for each risk relationship, an electronic record identifier and a set of attribute values; means for processing the information request via a customized vendor-specific information sharing portal interface display; means for executing an algorithm to adjust, based on at least one attribute value retrieved from the multi-vendor risk relationship data store, interactions with the vendor platform via the customized vendor-specific information sharing portal interface display; means for aggregating information associated with a plurality of vendor platforms; and means for transmitting the aggregated information to a remote administrator device associated with the enterprise.

In some embodiments, a communication device associated with an information sharing portal computer server exchanges information with remote devices in connection with an interactive graphical user interface. The information may be exchanged, for example, via public and/or proprietary communication networks.

A technical effect of some embodiments of the invention is an improved and computerized way to facilitate the use and analysis of multi-vendor electronic record information and messaging in a way that provides faster, more accurate results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 5 is a more detailed claim display according to some embodiments.

FIG. 6 is a contact information display in accordance with some embodiments.

FIG. 7 is a vendor portal request display according to some embodiments.

FIG. 8 is a request details display in accordance with some embodiments.

FIG. 9 is a claim handler records display according to some embodiments.

FIG. 11 is a disability intake display according to some embodiments.

FIG. 15 is a vendor new referral display according to some embodiments.

FIG. 19 is a portion of a tabular multi-vendor insurance database according to some embodiments.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of electronic record attribute update, utilization, and/or analysis by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, updated, and analyzed via a back-end-end application server to accurately improve the exchange of information, thus improving the overall efficiency of the system associated with message storage requirements and/or bandwidth considerations (e.g., by reducing the number of messages that need to be transmitted via a network, by improving response times by automatically attaching certain authorization forms, and/or by creating more complete and/or accurate documents). Moreover, embodiments associated with collecting accurate information might further improve risk values, predictions of risk values, allocations of resources, electronic record processing decisions, etc.

Figure 1:
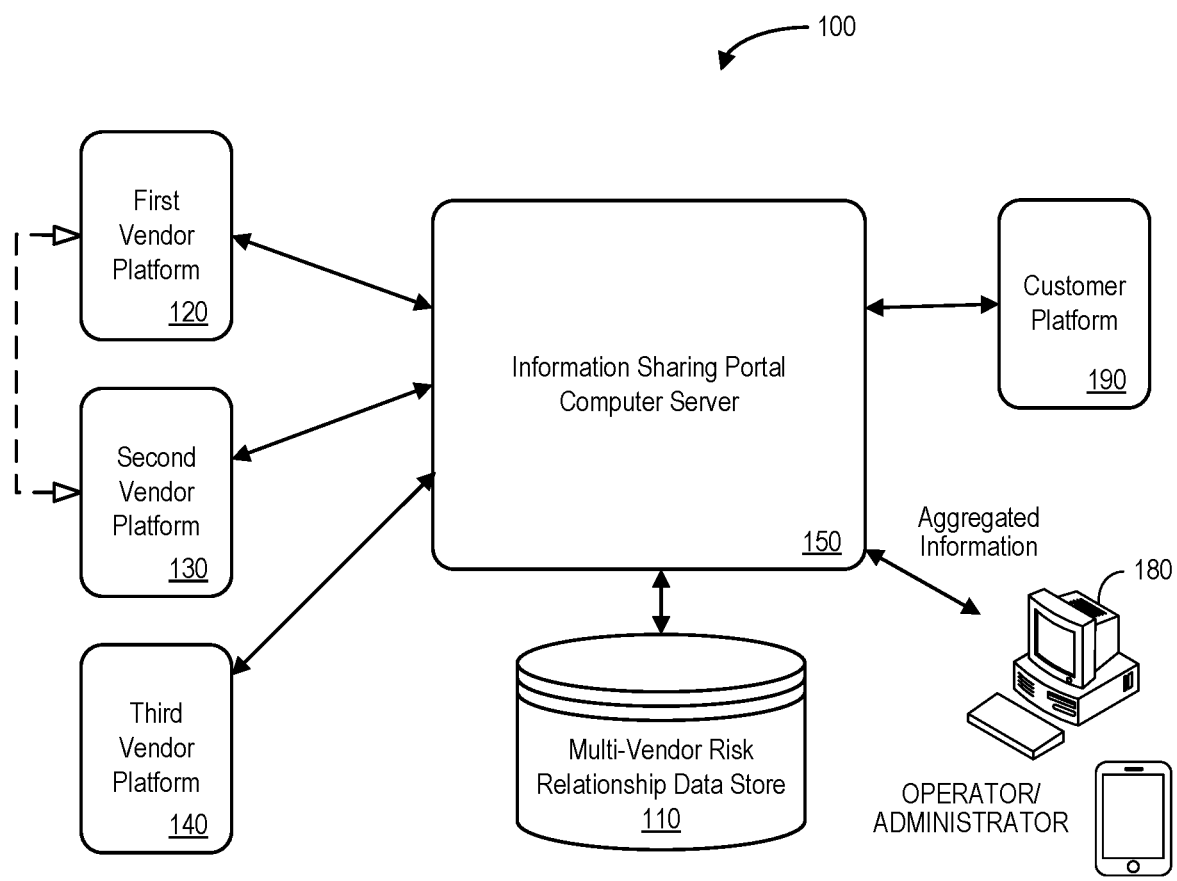
FIG. 1 is a high-level block diagram of a system in accordance with some embodiments.

In some cases, a resource value associated with an enterprise system may depend at least in part on attribute values of electronic records representing a plurality of risk associations and vendors associated with an enterprise system. For example, the resource value might tend to increase when a specific type of attribute value increases (or decrease when another type of attribute value increases). Manually entering information to update attribute values by an enterprise, however, can be a time consuming and error prone process, especially when a substantial number of electronic records, vendors, employers, employees, and/or attribute variables may influence the behavior of the system. To address this issue, FIG. 1 is a high-level block diagram of a system 100 according to some embodiments of the present invention. In particular, the system 100 includes an information sharing portal computer server 150 that may access information in a multi-vendor risk relationship data store 110 (e.g., storing a set of electronic records representing risk associations, each record including, for example, one or more risk relationship identifiers, vendor identifiers, employer and employee identifiers, attribute variables, resource values, etc.). The information sharing portal computer server 150 may also exchange information with vendor platforms 120, 130, 140 to verify, update, and/or utilize the electronic records. The information sharing portal computer server 150 may also exchange information with a remote operator or administrator device 180 (e.g., via a firewall) and/or a customer platform 190. According to some embodiments, an interactive graphical user interface platform of the information sharing portal computer server 150 (and, in some cases, third-party data) may facilitate document creation, decisions, predictions, and/or the display of aggregated results via one or more remote administrator displays or portals (e.g., to gather additional information about multi-vendor associations). For example, a remote administrator device 180 may receive an executive summary associated with multiple vendors from the information sharing portal computer server 150. Based on a review of the executive summary or information from vendor platforms 120, 130, 140, the information sharing portal computer server 150 may adjust data in the multi-vendor risk relationship data store 110, automatically create a new risk relationship document, generate electronic messages or calendar events, etc. Note that the information sharing portal computer server 150 and/or any of the other devices and methods described herein might be associated with a third party, such as company that performs a service for an enterprise.

The information sharing portal computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" information sharing portal computer server 150 (and/or other elements of the system 100) may facilitate updates and utilization of electronic records in the multi-vendor risk relationship data store 110. As used herein, the term "automated" may refer to, for example, actions that can be performed with little (or no) intervention by a human.

As used herein, devices, including those associated with the information sharing portal computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The information sharing portal computer server 150 may store information into and/or retrieve information from the multi-vendor risk relationship data store 110. The multi-vendor risk relationship data store 110 might, for example, store electronic records representing a plurality of risk associations, each electronic record having a set of attribute values. The multi-vendor risk relationship data store 110 may also contain information about prior and current interactions with parties, including those associated with vendor platforms 120, 130, 140 and remote devices 180. The multi-vendor risk relationship data store 110 may be locally stored or reside remote from the information sharing portal computer server 150. As will be described further below, the multi-vendor risk relationship data store 110 may be used by the information sharing portal computer server 150 in connection with an interactive user interface to update electronic records. Although a single information sharing portal computer server 150 is shown in FIG. 1, any number of such devices may be included. Moreover, various devices described herein might be combined according to embodiments of the present invention. For example, in some embodiments, the information sharing portal computer server 150 and a document or image server might be co-located and/or may comprise a single apparatus.

Figure 2:
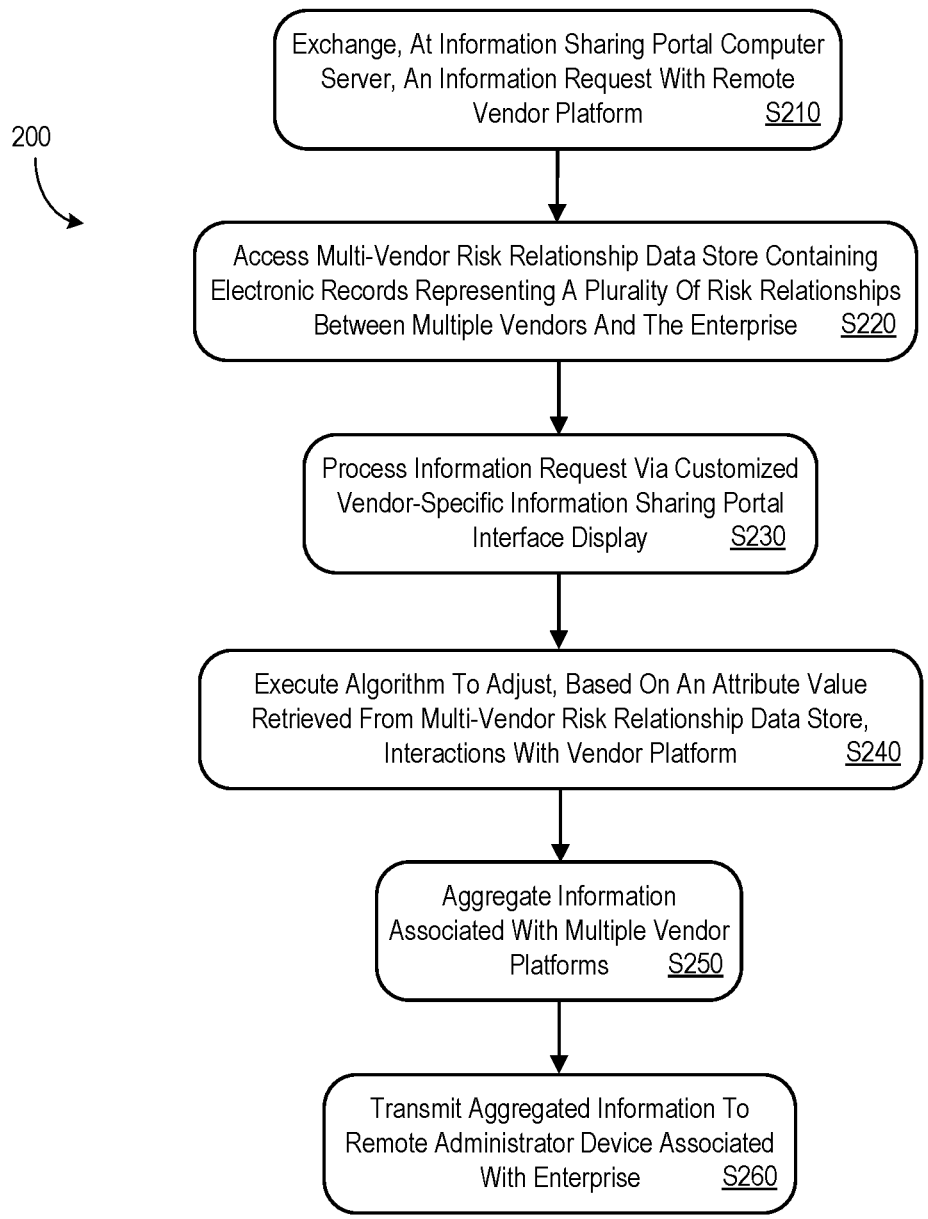
FIG. 2 illustrates a method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an information sharing portal computer server may exchange an information request with a remote vendor platform. The information request may be associated with an employee of a sponsor associated with the vendor platform. According to some embodiments, the information request may be associated with a request for information from a vendor. Moreover, in some embodiments, the request is only processed by the information sharing portal computer server if an employee has submitted an executed form and an electronic file containing a copy of the executed form is automatically attached to a message associated with the request. The executed form might be associated with, for example, a medical release, a universal medical authorization, a secured voice authorization, a Health Insurance Portability and Accountability Act ("HIPPA") consent, etc.

According to some embodiments, the information request is instead associated with a referral recommendation. For example, the risk relationship might be associated with an insurance policy (e.g., short term disability, long term disability, workers' compensation, a leave management program, a financial services program, a vison vendor program, a disease management program, an employee assistance program, a case management program, a life insurance program, an American Disabilities Act ("ADA") accommodation program, a behavioral health consulting program, a consulting services program, a leave management program, etc.), the sponsor may be associated with an employer, the vendor platform may be associated with a medical service provider, the referral recommendation might indicate that particular employee should contact and/or work with a medical service provider.

At S220, the system may access a multi-vendor risk relationship data store containing electronic records representing a plurality of risk relationships between multiple vendors and the enterprise. For each risk relationship, the data store may contain an electronic record identifier and a set of attribute values. At S230, the system may process the information request via a customized vendor-specific information sharing portal interface display.

At S240, the system may execute an algorithm to adjust, based on at least one attribute value retrieved from the multi-vendor risk relationship data store, interactions with the vendor platform via the customized vendor-specific information sharing portal interface display. Such an algorithm based approach may let the system dial up or dial down various models to quickly and automatically respond to business situation changes to effectively respond to changes in market or insurance company appetite. At S250, the system may aggregate information associated with a plurality of vendor platforms. The system may then transmit the aggregated information to a remote administrator device associated with the enterprise at S260 (e.g., as one or more executive summary documents).

According to some embodiments, the information sharing portal computer server is further coupled to a claims processing platform. The claims processing platform might, for example, facilitate handling insurance claims. In some embodiments, the information sharing portal computer server is further coupled to an intake platform to receive information about new programs, employees, insurance claims, etc.

Figure 3:
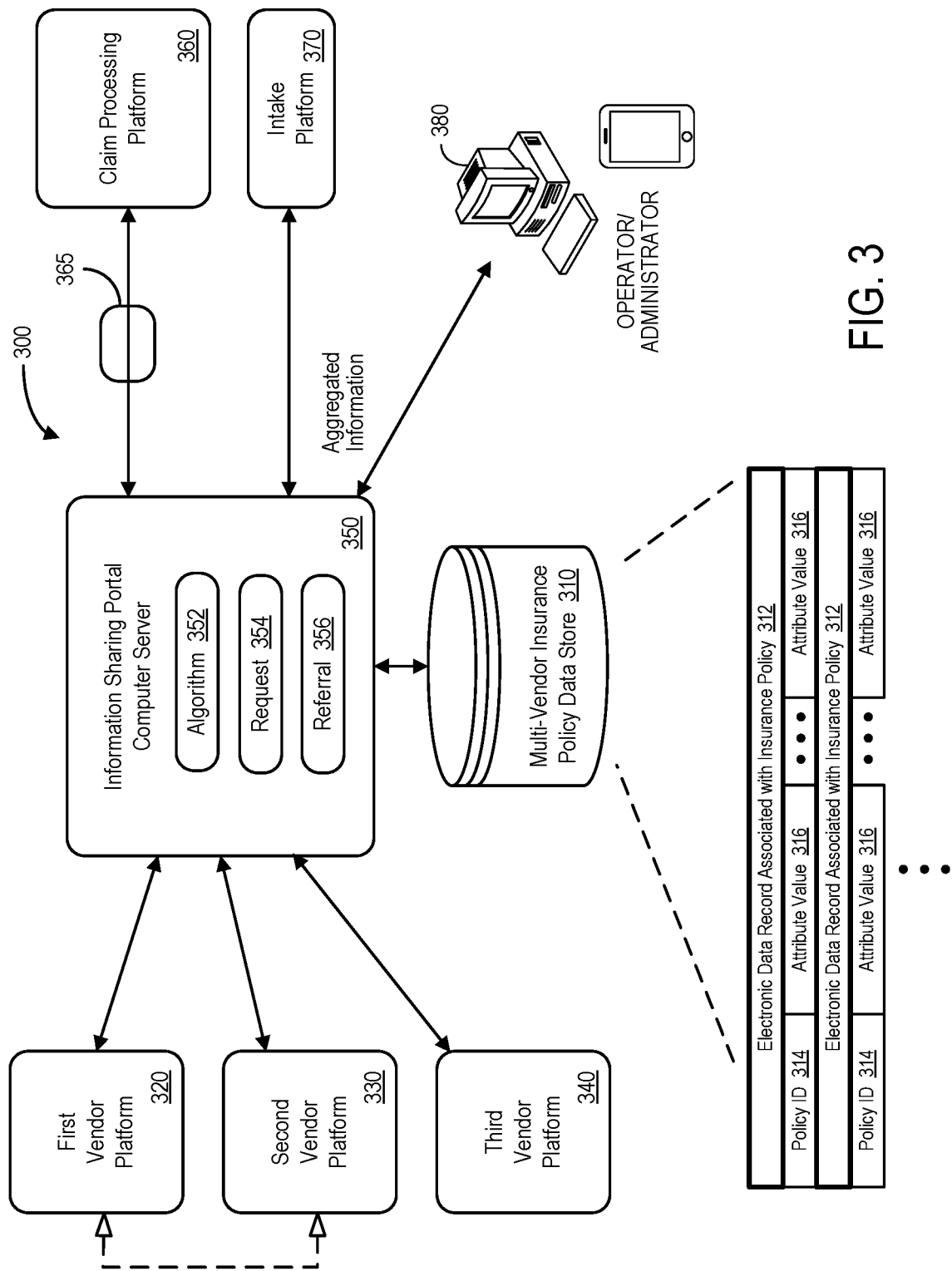
FIG. 3 is a more detailed block diagram of an insurance system according to some embodiments.

In this way, a system may let users update electronic records associated with risk relationships and vendors working with an enterprise. According to some embodiments, the multi-vendor "risk relationships" are associated with insurance policies and at least some multi-vendor resource values are associated with insurance programs. For example, FIG. 3 is a more detailed block diagram of a system 300 according to some embodiments. As before, the system 300 includes an information sharing portal computer server 350 that may access information in a multi-vendor insurance policy data store 310 (e.g., storing a set of electronic records 312 representing insurance policies, each record including, for example, one or more insurance policy identifiers 314, attribute variables 316, etc.). The information sharing portal computer server 350 may also retrieve information from vendor platforms 320, 330, 340 to update or utilize the electronic records. The information sharing portal computer server 350 may also exchange information with a remote claim processing platform 360 (e.g., via a firewall 365), intake platform 370, operator or administrator terminals 380, etc. According to some embodiments, an interactive graphical user interface platform and/or algorithm 352 of the information sharing portal computer server 350 may facilitate document creation, decisions, predictions, and/or the display of results via one or more remote administrator computers 380. The information sharing portal computer server 350 may process, according to some embodiments, vendor requests 354, program referrals 356, etc.

According to some embodiments, the information sharing portal computer server 350 may also receive external information, such as third-party data, document data, governmental data, etc. This data might be used, for example, to pre-populate fields in the multi-vendor insurance policy data store 310. A user may then review the information (e.g. via a vendor platform 320, 330, 340 or the remote administrator device 380) and transmit updated information to the information sharing portal computer server 350. Based on the updated information, the information sharing portal computer server 350 may adjust or utilize data in the multi-vendor insurance policy data store 310 and automatically generate appropriate documents or executive summary reports. According to some embodiments, the information sharing portal computer server 350 may transmit information to an email server, workflow application, or calendar function (e.g., to generate reminders when a vendor needs to perform a certain action). Similarly, the information sharing portal computer server 350 might transmit updated electronic records 312 to the claim processing platform 360 to facilitate insurance claim handling.

Some embodiments allow vendors to establish two-way connections with an enterprise via vendor platforms 320, 330, 340 and portals without letting the vendors communicate directly with each other. In other embodiments, the vendor platforms 320, 330, 340 may be able to communicate with each other (as illustrated by a dashed arrow in FIG. 1). In some embodiments, vendors might process document requests, program referrals, and/or view claim status for employees. According to some embodiments, referrals may be based on the algorithm 352 and key words at intake (e.g., "back pain") and medical codes that are programmed as triggers for specific programs. Moreover, a plan sponsor may receive an aggregated "roll up" or executive summary that shows all of the vendors and the activity that occurred between each one and the enterprise.

Figure 4:
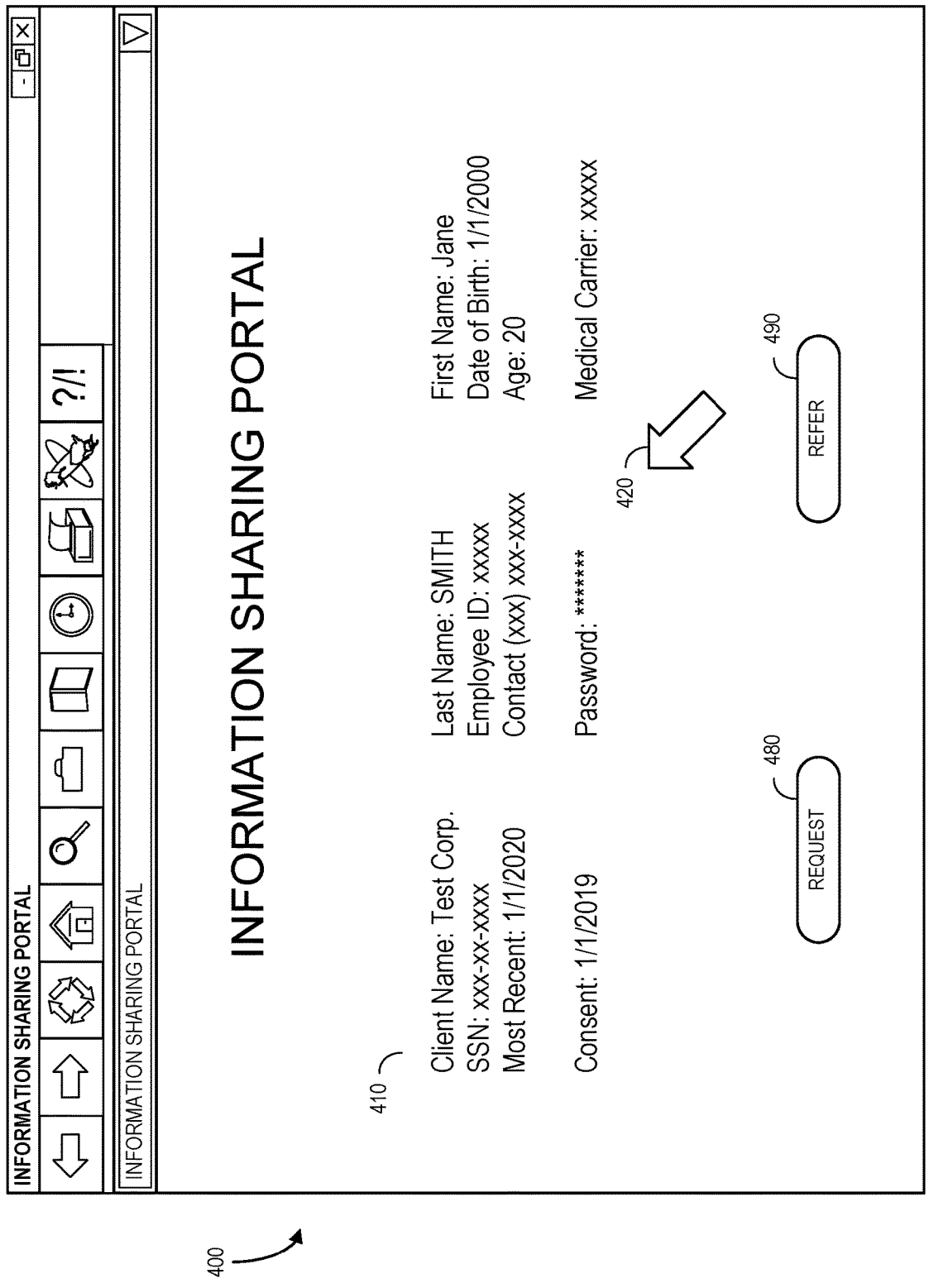
FIG. 4 is a claim handler request for information display in accordance with some embodiments.

FIG. 4 is a claim handler request for information display 400 in accordance with some embodiments. The display 400 includes claim details 410 (e.g., client name, employee identifier, age, etc.) and selection of an element via a touch screen or computer mouse pointer 420 may let a user view addition information (e.g., via a pop-up window) and/or adjust information on the display 400. Selection of a "Request" icon 480 might let the user generate an information request, and selection of a "Refer" icon 490 might let the user generate a program referral as described herein. Note that intake might represent the first opportunity to engage with a claimant, but engagement might happen at any point in the claim lifecycle. Moreover, an enterprise may obtain consent from a claimant to share information with vendors to facilitate referrals and/or requests for information. According to some embodiments, the system may identify opportunities based on a claimant's condition and vendor trigger information captured at implementation.

FIG. 5 is a more detailed claim display 500 according to some embodiments. The display 500 includes claim details 510 (e.g., client name, employee identifier, age, etc.) and selection of an element via a touch screen or computer mouse pointer may let a user view addition information and/or adjust information on the display 500. Selection of a "Back" icon 580 or a "Next" icon 590 might let the user navigate to other displays as described herein. The display 500 also includes specific claim data 520, eligibility data 530, and provider/clinical data 540 (e.g., including an International Statistical Classification of Diseases and Related Health Problems ("ICD") code, a Current Procedures Terminology ("CPT") code, etc.).

FIG. 6 is a contact information display 600 in accordance with some embodiments. The display 600 includes claim details 610 (e.g., client name, employee identifier, age, etc.) and selection of an element via a touch screen or computer mouse pointer may let a user view addition information and/or adjust information on the display 600. Selection of a "Back" icon 680 or a "Next" icon 690 might let the user navigate to other displays as described herein. The display 600 also includes contact information 620 such as an address, telephone number, indications of whether information has been verified, etc.

According to some embodiments, an enterprise may request information from a vendor (e.g., a medical file). For example, if an enterprise is having difficulty obtaining medical records, a user may confirm that a claimant authorization is in the file and submit a request for information performed. A vendor contact may then receive the request for information, confirm that the authorization/claimant consent is in the file, and attach the necessary information to satisfy the request. The information may then be received by the enterprise and uploaded directly to the claim file for use.

FIG. 7 is a vendor portal request display 700 according to some embodiments. The display 700 includes where the request will be sent 710 and a request type selectable via a computer mouse pointer 720 along with manually entered claim details. Note that a medical release may be automatically selected on the display 700 before the request is "Saved" 780 or "Canceled" 790.

In this way, a request can be sent from the enterprise to a specific vendor to obtain information to assist in claim management. According to some embodiments, a request will only be made with a completed Universal Medical Authorization ("UMA") or Secured Voice Authorization ("SVA") form is in the file. A copy of the UMA or SVA may be automatically attached to the request so the recipient can confirm that the claimant has provided a sharing authorization. Moreover, the recipient may be unable to attach a document if there is not a completed UMA or SVA for the claimant. Attached documents may populate directly into the claimant's claim file.

Consider, for example, Mr. Smith who is a 46-year-old male who is an employee. He has injured his back and needs surgery. His doctor advises that a vendor has approved the surgery in their pre-certification unit, and the enterprise sets up a disability claim for Mr. Smith. The claim handler notes that there is an UMA in the file and checks an "Integration Portal" tab to see what options may be available to help. The claim handler clicks on a "Create Request" option and a dialog page 710 opens with drop down options. The claim handler selects "Vendor Case Management" to receive the request. For the request type, the claim handler selects need copies of treatment notes from dropdown list. The claim handler adds details, checks the medical release box, and selects the "Save" icon 780.

Figure 8:
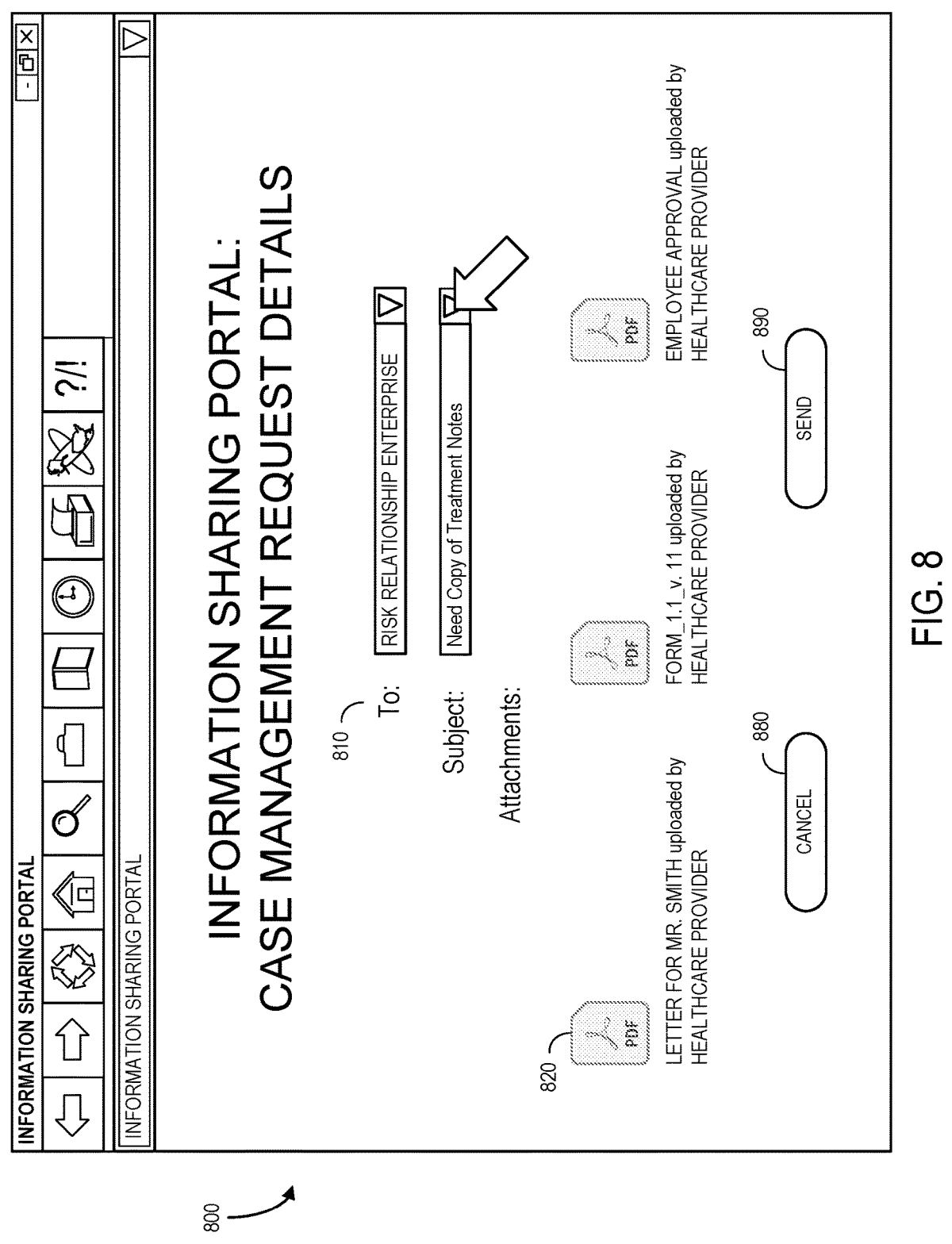

FIG. 8 is a request details display 800 in accordance with some embodiments. As before, the display 800 includes where the request will be sent 810 and a request type selectable via a computer mouse pointer along a set of attached documents 820 (including automatically attached authorization forms). The request may then be "Canceled" 880 or "Sent" 890 to the vendor. Consider, for example, Ms. Jones at a vendor who received a request for medical records. She may note that a universal consent is attached to the request to ensure Mr. Smith has given a HIPAA consent. Ms. Jones may then easily and quickly attach an approval and the medical records she used to approve the surgery. She may also indicate that the records were provided so the plan sponsor can see outcomes of referral and request activity. These records may drop directly into the appropriate disability claim, the claim handler may be alerted that new records have been received, and Mr. Smith's short-term disability claim may be approved.

Figure 10:
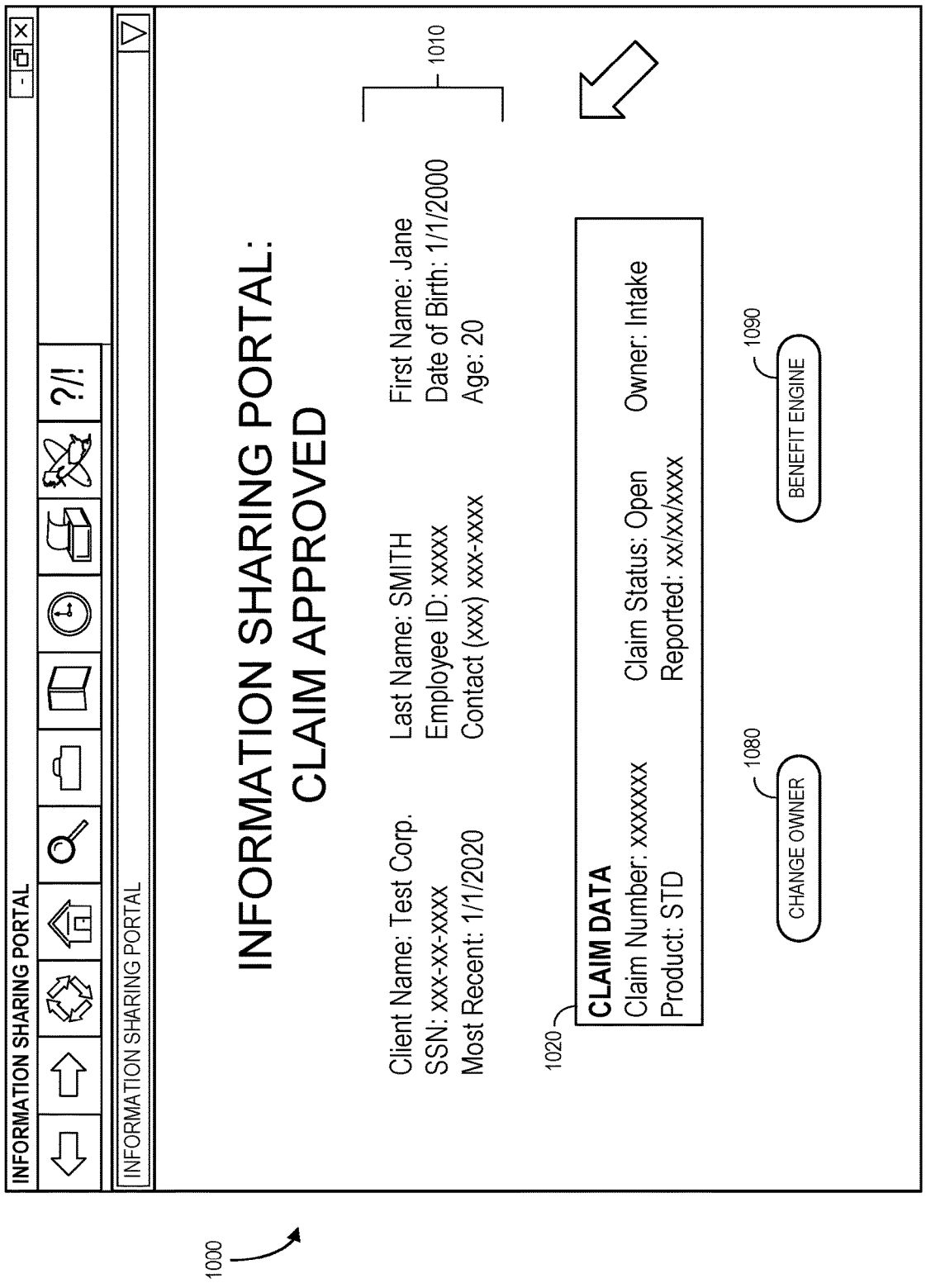
FIG. 10 is an approved claim display in accordance with some embodiments.

FIG. 9 is a claim handler records display 900 according to some embodiments. The display 900 includes records 910 including a document name, creation date, status, time of day, document source, document identifier, etc. Selection of a document (e.g., as indicated by bold lines in FIG. 9) may let a user "Deny" 980 or "Approve" 990 the document. FIG. 10 is an approved claim display 1000 in accordance with some embodiments. The display 1000 includes claim details 1010 along with specific claim data 1020 (e.g., claim number, claim status, owner, product, date claim was reported, etc.) along with options to "Change Owner" 1080 or activate a "Benefit Engine" 1090. The display 1000 may help the system avoid duplicative work and/or allow for a substantially integrated implementation of the processing system.

Figure 11:
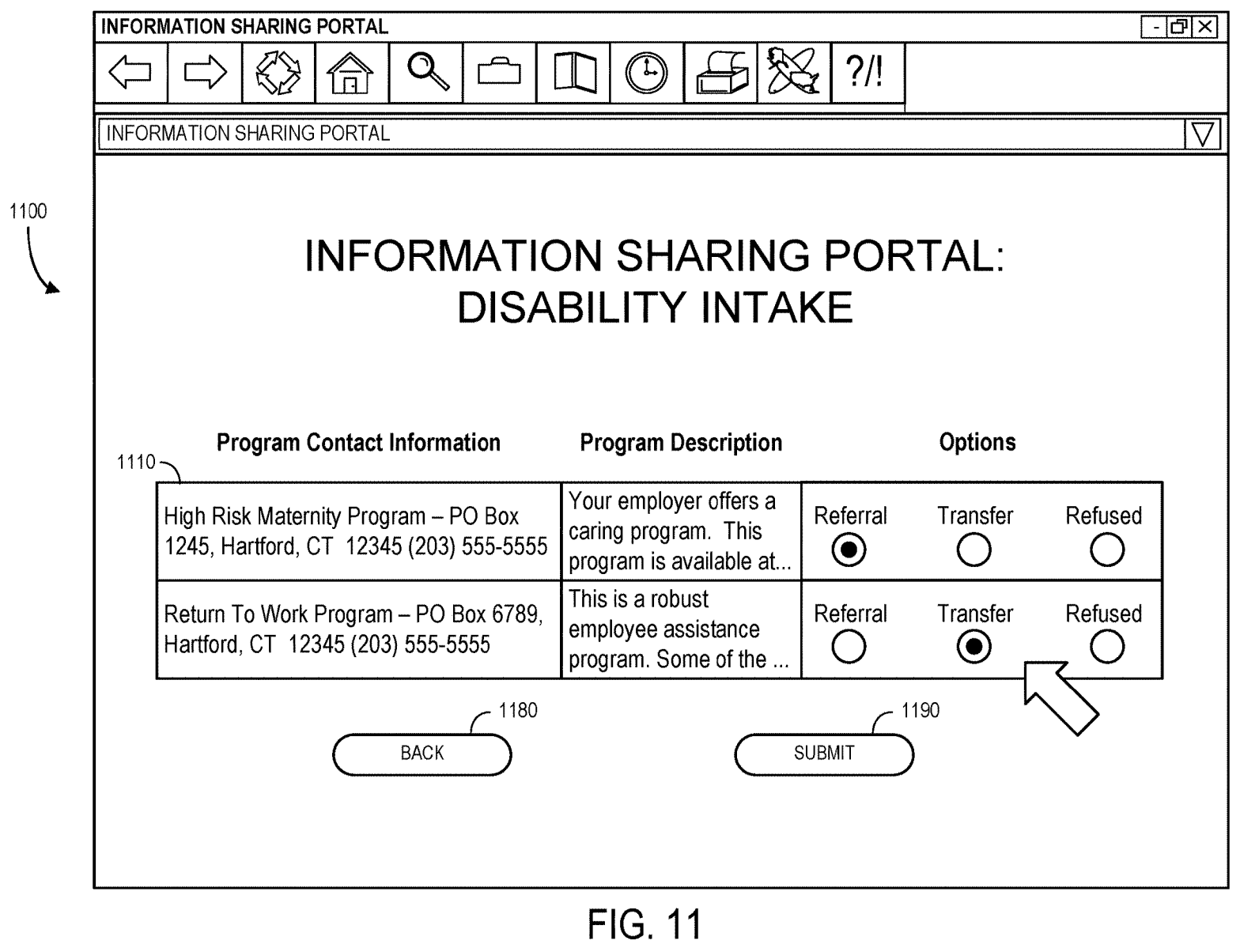

FIG. 11 is a disability intake display 1100 according to some embodiments. The display 1100 includes records 1110 including program contact information, a program description, various options including, but not limited to, an option to go "Back" 1180 and "Submit" 1190. Consider, for example, Ms. West who is a 42-year-old female employee. She is having pregnancy complications and calls a disability program to initiate a claim. Her doctor tells her she will be on bed rest until she delivers and that she has preterm labor. The baby is at risk for being in a Neonatal Intensive Care Unit ("NICU"). Ms. West has a health carrier with a high-risk maternity program that may help her during this stressful time. An enhanced SVA allows the enterprise to make referrals to appropriate external vendors/carriers. As the Intake script is documented, the system auto retrieves all pertinent information and provides an intake team with the records 1110 in FIG. 11 for integration consideration. The intake staff can offer available options to Ms. West and click whichever option is selected (e.g., referral, transfer, refused, etc.). The system may also auto-generate a referral in the vendor portal which auto-generates an email to the program contact in their preferred email system (e.g., Outlook® from MICROSOFT). Note that the system may be aware of all triggers/programs/contacts to make connections quickly, efficiently, and accurately and to ensure that consent has been obtained.

Figure 12:
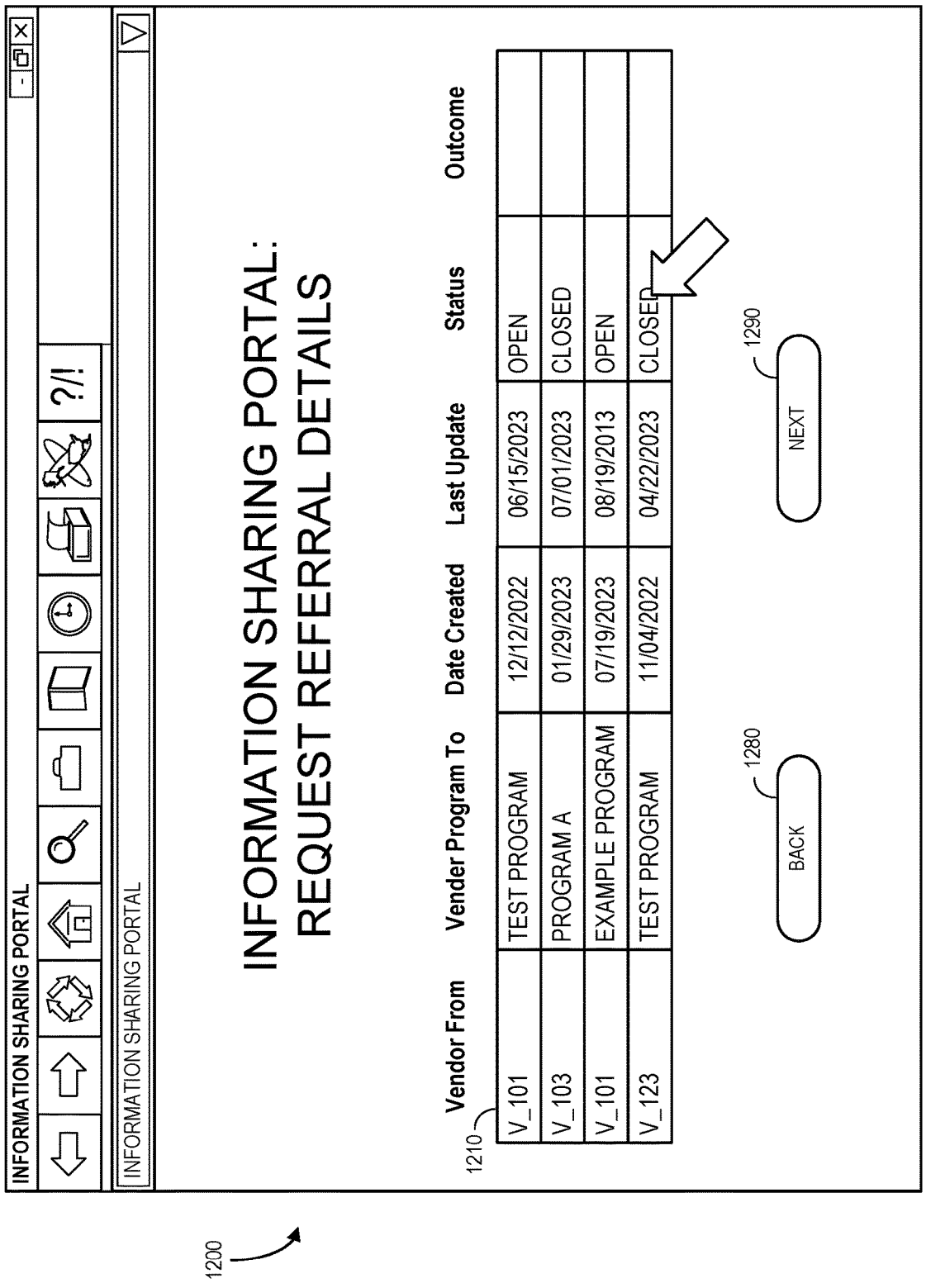
FIG. 12 is a request referral details display in accordance with some embodiments.

According to some embodiments, the system may send a referral as an established (warm transfer or electronic) referral during intake or at any appropriate point through the life of the claim. For electronic referrals, an email notification may be automatically sent to the selected vendor who can log into the portal to view referral details. Note that clinical and provider information might only be displayed when an authorization is obtained. The vendor may then outreach to the member and update the system with an outcome (e.g., declined or accepted). FIG. 12 is a request referral details display 1200 in accordance with some embodiments. The display 1200 includes electronic records 1210 including a vendor from, a vendor program to, a date created, a date last updated, a status, an outcome, etc. The user can select "Back" 1280 or "Next" 1290 to navigate through the portal.

Figure 13:
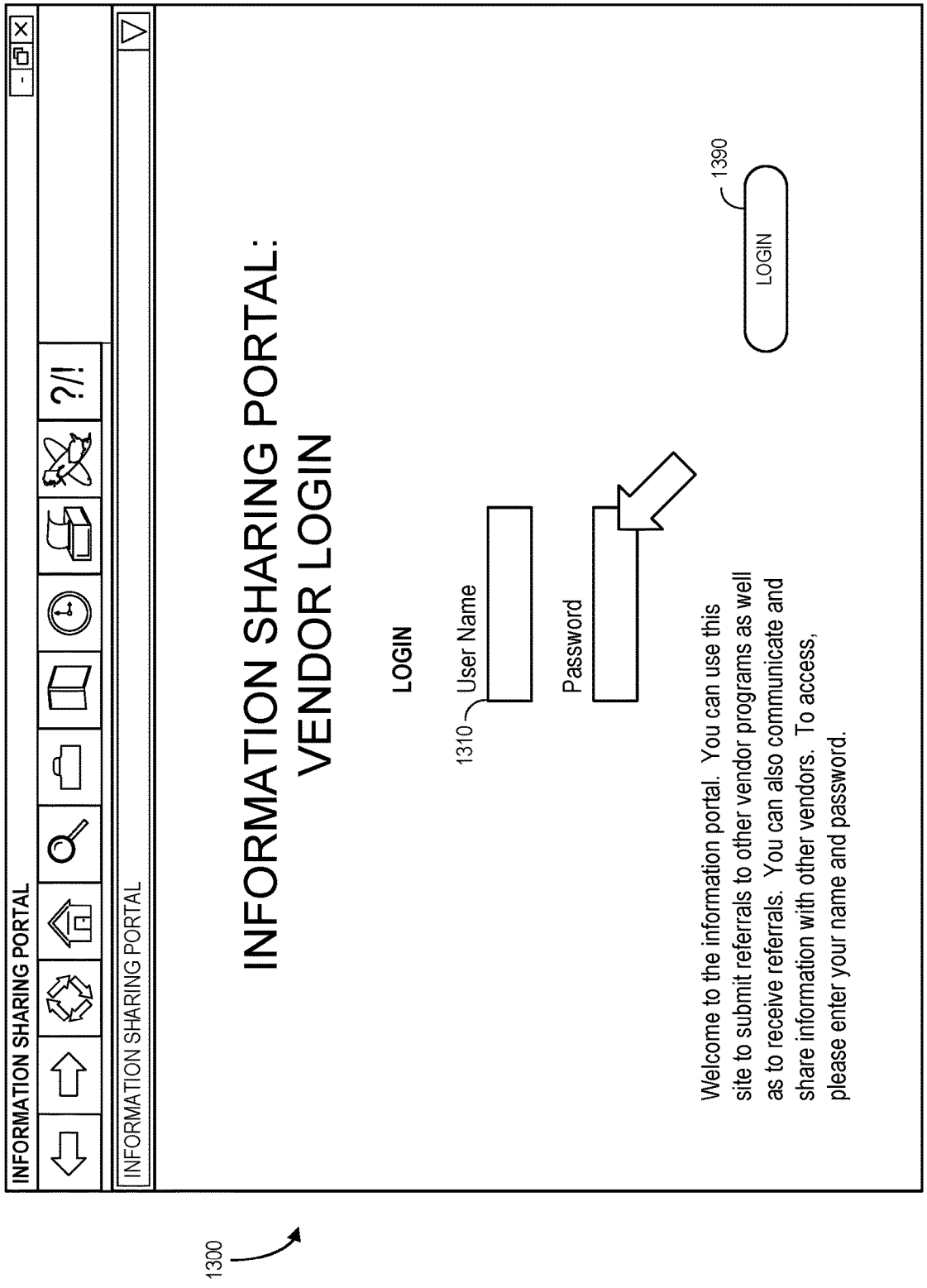
FIG. 13 is a vendor login display according to some embodiments.
Figure 14:
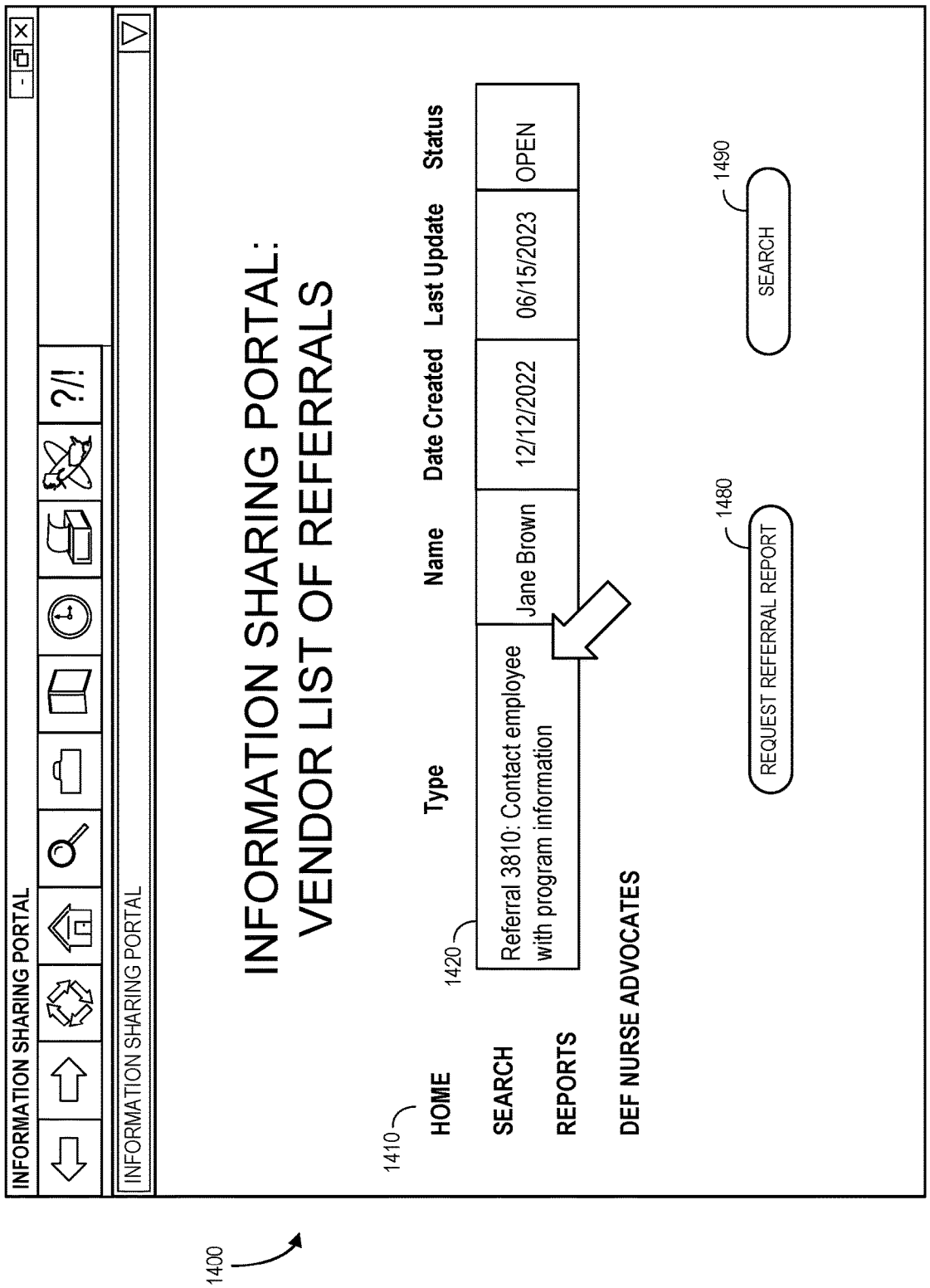
FIG. 14 is a vendor referrals and request display in accordance with some embodiments.

FIG. 13 is a vendor login display 1300 according to some embodiments. The display 1300 lets a user provide a user name 1310 and password to "Login" 1390 the system. Consider, for example, Ms. North who is a nurse who receives an auto-generated email notifying her of a referral. She enters her user name 1310 and password and a list of referrals and requests appears on the portal. For example, FIG. 14 is a vendor referrals and request display 1400 in accordance with some embodiments. The display 1400 includes options to navigate 1410 (e.g., home, search, reports, etc.) along with an electronic record 1420 including a type, name, date created, date updated, and status. Ms. North clicks on "Referral" icon 1480 and sees the employee's condition and her claim and clinical detail (because prior consent was given to the enterprise). Ms. North brings herself up to speed on the employee's situation and immediately calls her to see if she is interested in services. The employee accepts services and she and her family are supported over the next ten weeks during this difficult time. Ms. North also has the option, per the display 1400, to click on "Search" icon 1490.

FIG. 15 is a vendor new referral display 1500 according to some embodiments. The display 1500 includes where the referral will be sent 1510 and a referral type selectable via a computer mouse pointer along with manually entered referral notes and comments. The display 1500 may let a user decide to "Submit" 1580 or "Cancel" 1590 the referral. Consider, for example, Mr. Adams who completes a pre-certification and his surgery is approved. He is able to advise the enterprise that an employee will need to initiate a new claim. He selects a referral type. Since he wants the enterprise to initiate a new claim, he chooses "Disability" in the referral to box and asks the enterprise to contact the member. Next, in notes, he explains why he is referring this member to the enterprise for disability. The referral is received at the enterprise and is placed in a portal queue. The referral is sent to clinical intake where a call is placed to the employee to set up his new claim. An enhanced SVA allows the enterprise to collect/share clinical information and make referrals as indicated. As the intake script is documented, the system auto runs trigger algorithms based on all pertinent information and provides intake with a text box for integration consideration.

Figure 16:
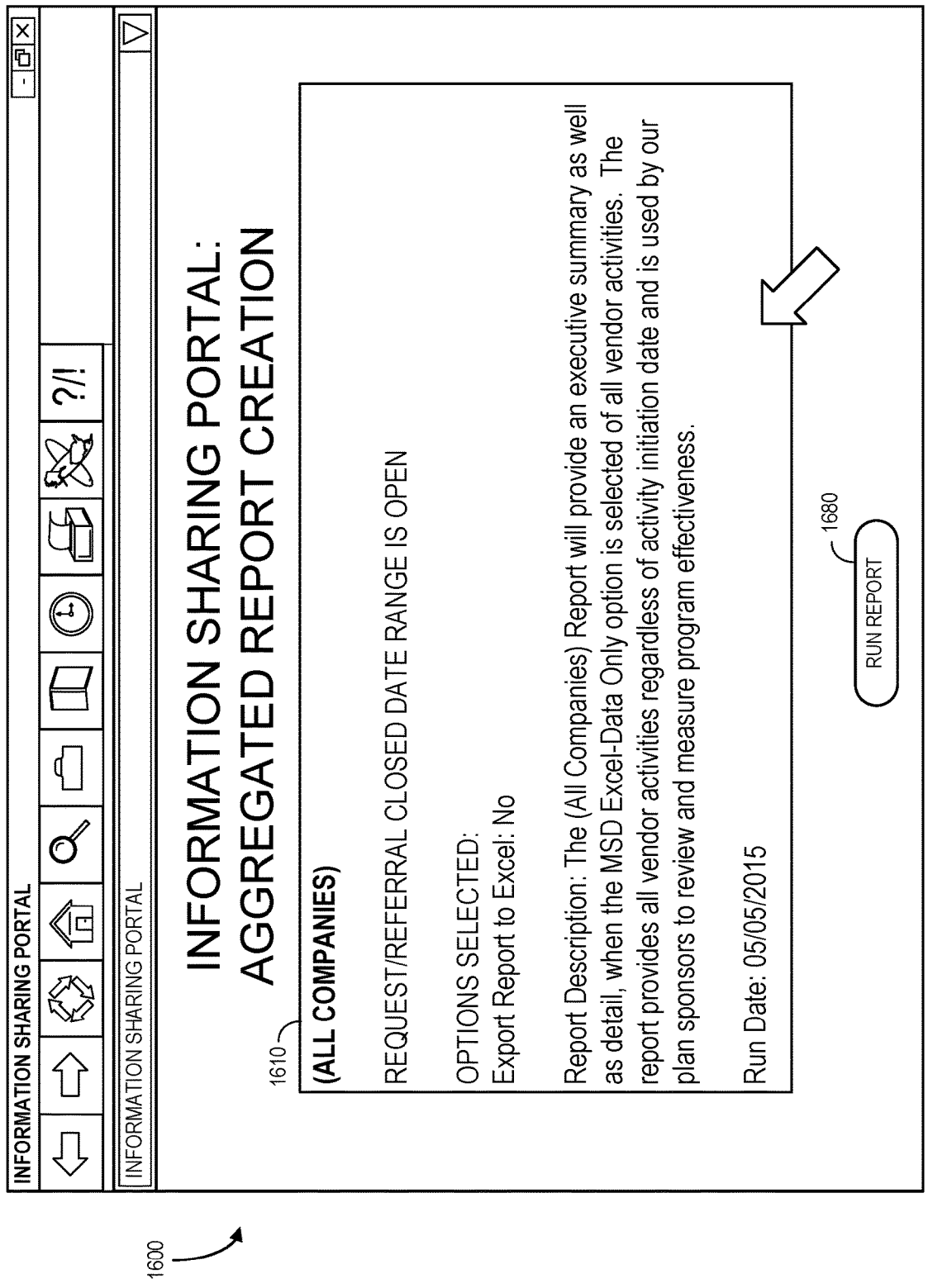
FIG. 16 is an aggregated report creation display in accordance with some embodiments.
Figure 17:
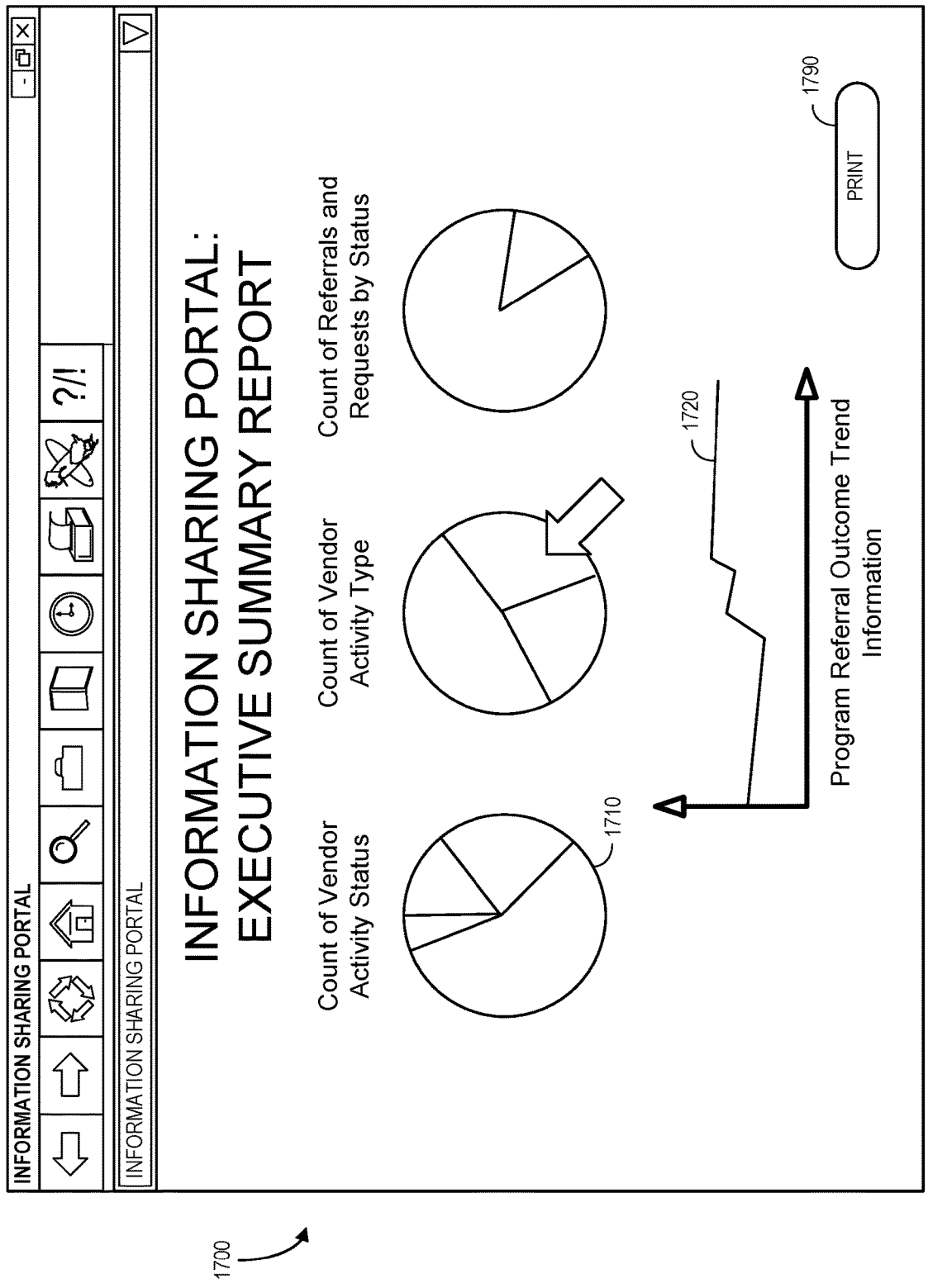
FIG. 17 is an executive summary display according to some embodiments.

FIG. 16 is an aggregated report creation display 1600 in accordance with some embodiments. The display 1600 includes a report creation and definition area 1610 that shows the filters and/or parameters that were used to generate an executive summary and a "Run Report" icon 1680 may initiate creation of the report. FIG. 17 is an executive summary display 1700 according to some embodiments. The display 1700 includes multiple charts 1710 that may indicate, for example, a count of vendor activity status, a count of vendor activity type, a count of referrals and requests by status, etc. According to some embodiments, the display may include program referral outcome trend information 1720 (e.g., graphs over time) as well as summary data, detailed analytical reports, drill-down investigative opportunities, etc. A "Print" icon 1790 may be selected by a user to generate a paper copy of the report.

Figure 18:
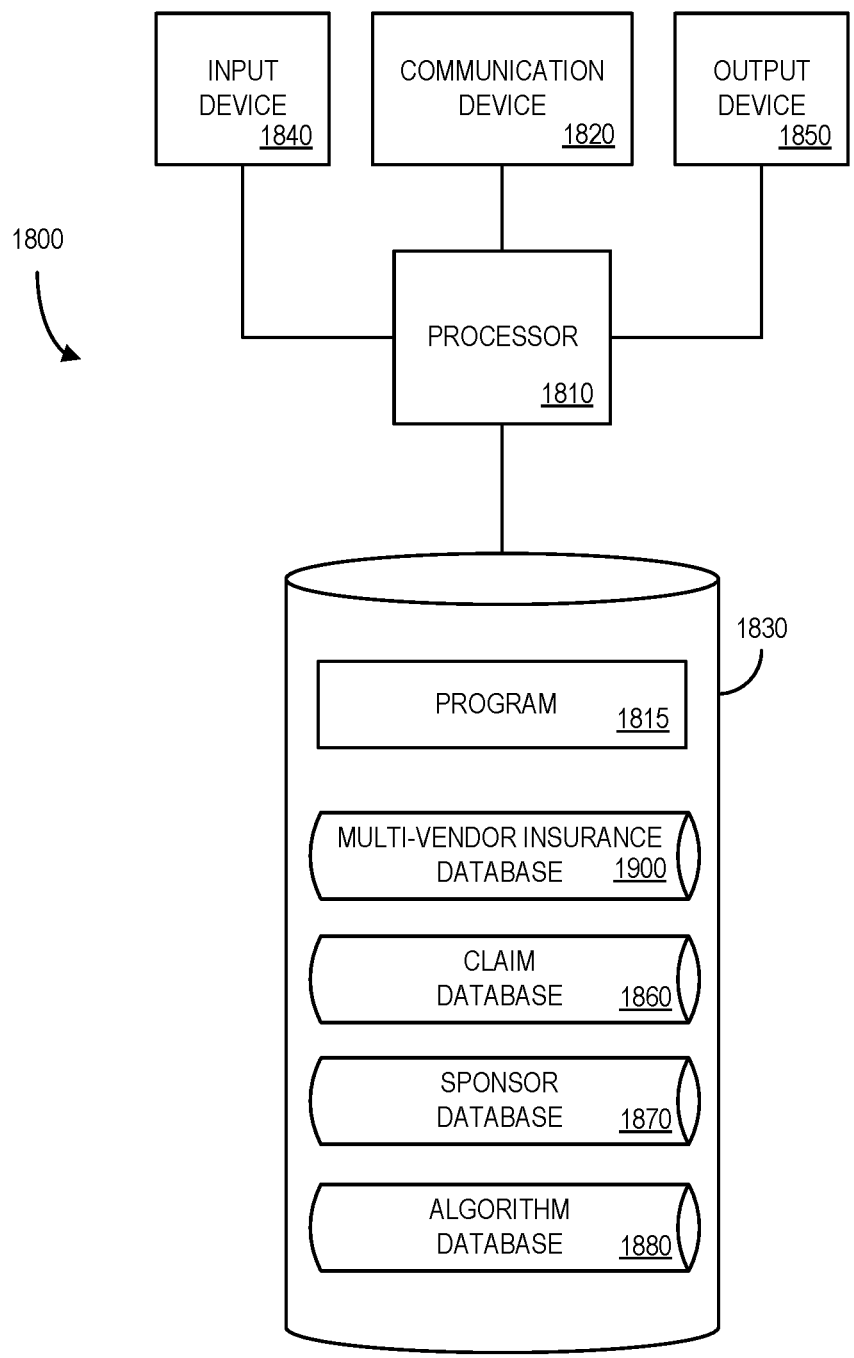
FIG. 18 is a block diagram of an apparatus in accordance with some embodiments of the present invention.

The embodiments described herein may be implemented using any number of different hardware configurations. For example, FIG. 18 illustrates an apparatus 1800 that may be, for example, associated with the systems 100, 300 described with respect to FIGS. 1 and 3, respectively. The apparatus 1800 comprises a processor 1810, such as one or more commercially available Central Processing Units ("CPUs") in the form of one-chip microprocessors, coupled to a communication device 1820 configured to communicate via a communication network (not shown in FIG. 18). The communication device 1820 may be used to communicate, for example, with one or more remote administrator computers and or communication devices (e.g., PCs and smartphones). Note that communications exchanged via the communication device 1820 may utilize security features, such as those between a public internet user and an internal network of the insurance enterprise. The security features might be associated with, for example, web servers, firewalls, and/or PCI infrastructure. The apparatus 1800 further includes an input device 1840 (e.g., a mouse and/or keyboard to enter information about a referral program algorithms) and an output device 1850 (e.g., to output reports regarding vendor statistics and analytics).

The processor 1810 also communicates with a storage device 1830. The storage device 1830 may comprise any appropriate information storage device, including combinations of magnetic storage devices (e.g., a hard disk drive), optical storage devices, mobile telephones, and/or semiconductor memory devices. The storage device 1830 stores a program 1815 and/or a risk evaluation tool or application for controlling the processor 1810. The processor 1810 performs instructions of the program 1815, and thereby operates in accordance with any of the embodiments described herein. For example, the processor 1810 may access a multi-vendor risk relationship data store containing electronic records that represent a plurality of risk relationships between multiple vendors and an enterprise and, for each risk relationship, an electronic record identifier and a set of attribute values. The processor 1810 may exchange an information request with a remote vendor platform. The information request may be, for example, associated with an employee of a sponsor associated with the vendor platform. The processor 1810 may process the information request via a customized vendor-specific information sharing portal interface display and execute an algorithm to adjust, based on at least one attribute value, interactions with the vendor platform via the portal interface display. The processor 1810 may also aggregate information associated with a plurality of vendor platforms and transmit the aggregated information to a remote administrator device associated with the enterprise.

The program 1815 may be stored in a compressed, uncompiled and/or encrypted format. The program 1815 may furthermore include other program elements, such as an operating system, a database management system, and/or device drivers used by the processor 1810 to interface with peripheral devices.

As used herein, information may be "received" by or "transmitted" to, for example: (i) the information sharing portal computer server 1800 from another device; or (ii) a software application or module within the information sharing portal computer server 1800 from another software application, module, or any other source.

In some embodiments (such as shown in FIG. 18), the storage device 1830 further stores a multi-vendor insurance database 1900, a claim database 1860 (e.g., storing a list of insurance claims), a sponsor database 1870 (e.g., storing information about sponsors, vendors, employers, etc.), and an algorithm database 1880 (e.g., storing information about keywords to automatically suggest program referrals). An example of a database that might be used in connection with the apparatus 1800 will now be described in detail with respect to FIG. 19. Note that the database described herein is only an example, and additional and/or different information may be stored therein. Moreover, various databases might be split or combined in accordance with any of the embodiments described herein. For example, the multi-vendor database 1900 and sponsor database 1870 might be combined and/or linked to each other within the program 1815.

Referring to FIG. 19, a table is shown that represents the multi-vendor insurance database 1900 that may be stored at the apparatus 1900 according to some embodiments. The table may include, for example, entries associated with requests exchanged via a portal. The table may also define fields 1902, 1904, 1906, 1908, 1910 for each of the entries. The fields 1902, 1904, 1906, 1908, 1910 may, according to some embodiments, specify: a request identifier 1902, a vendor identifier 1904, a program identifier 1906, a description 1908, and a status 1910. The multi-vendor insurance database 1900 may be created and updated, for example, based on information electrically exchanged via vendor portals.

The request identifier 1902 may be, for example, a unique alphanumeric code identifying a request that has been exchanged via a vendor portal. The vendor identifier 1904 might indicate a specific vendor and the program identifier 1906 might indicate a specific program associated with a medical service provider. The description 1908 might indicate if the request is an information request (e.g., a request to view a patient's medical chart) or a referral request (e.g., automatically suggested when triggered by a keyword during an intake process). The status 1910 might indicate, for example, that the request is "open" (e.g., pending resolution), "closed" (e.g., requested documents have already been provided), etc.

Thus, embodiments may provide an automated and efficient way to facilitate coordinate actions between an enterprise and multiple vendors. An information sharing portal may allow, for example, a disability claims team to facilitate connections with external health services vendors (for case management, disease management, behavioral health, etc.). Note that the sharing of information may facilitate claims management and ensure that a claimant is connected to all available resources for care and recovery. Moreover, an automated process may help identify available external programs, triggers, and contacts that are available to assist claimants. Some embodiments protect patient privacy by requiring data sharing agreements and claimant consent before any information about the claimant is shared. The portals may provide an improved experience for employees and claimants through an increased coordination of care information sharing in real-time with reporting to track activity by vendor, systemized tracking of available services for each claimant, and/or a reporting suite that gives an employer a single view into participation and utilization of all of their programs and provides a holistic view of referral activity and outcomes for each vendor to measure engagement. Further, plan sponsors can view utilization rates to analyze program effectiveness.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 20:
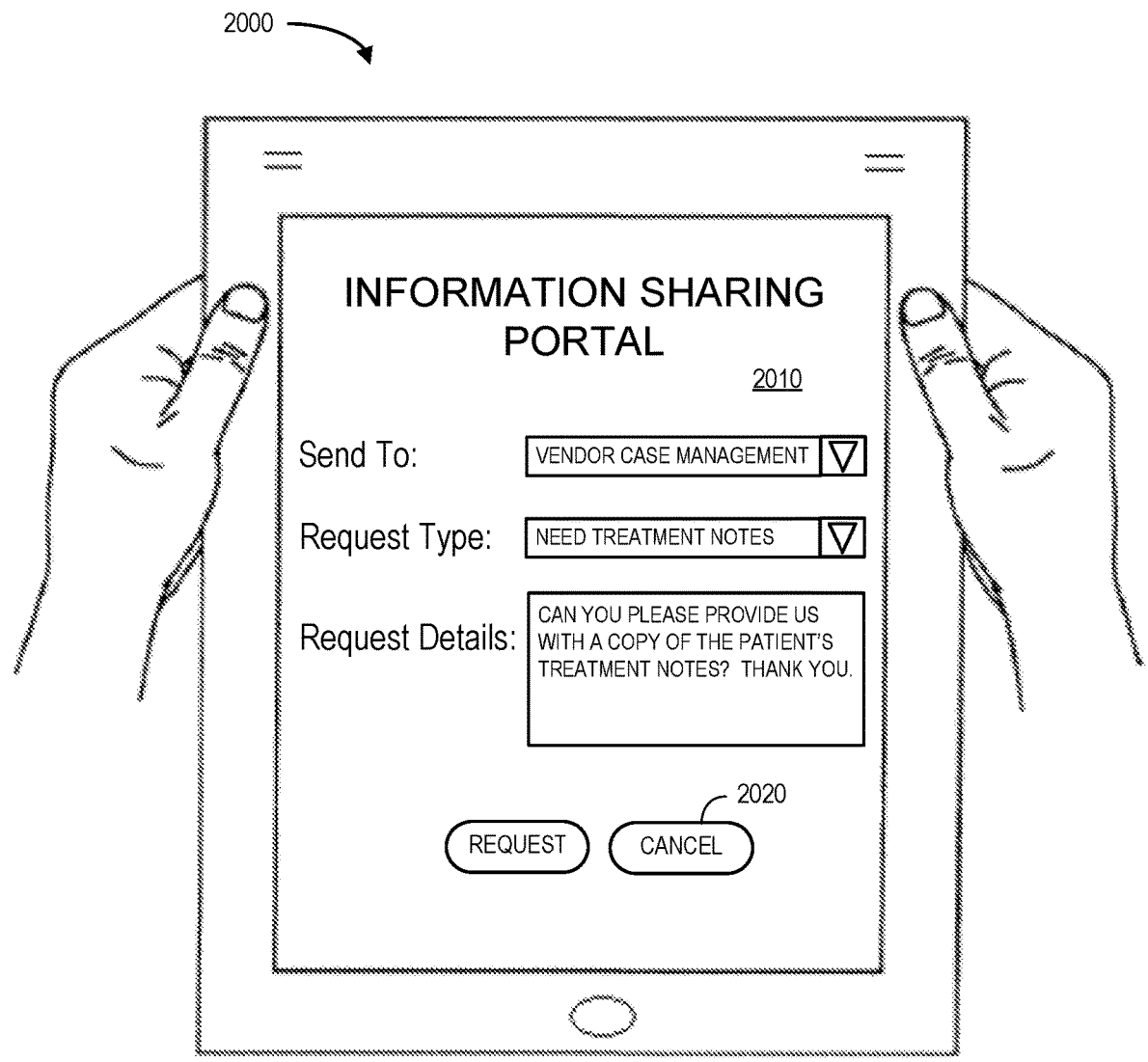
FIG. 20 illustrates a tablet computer displaying an information sharing user interface according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance policies in additional to and/or instead of the policies described herein (e.g., business insurance policies, automobile insurance policies, etc.). Similarly, although certain attributes were described in connection some embodiments herein, other types of attributes might be used instead. Still further, the displays and devices illustrated herein are only provided as examples, and embodiments may be associated with any other types of user interfaces. For example, FIG. 20 illustrates a handheld tablet computer 2000 showing an information sharing portal display 2010 according to some embodiments. The information sharing portal display 2010 might include user-selectable data that can be selected and/or modified by a user of the handheld computer 2000 to provide updated multi-vendor insurance information to an insurance enterprise (e.g., via icons 2020 to send a "Request" or "Cancel" an operation).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to facilitate an exchange of information via an information sharing portal computer server of an enterprise, comprising:
   (a) a multi-vendor risk relationship data store associated with an encrypted database management system and containing electronic records representing a plurality of risk relationships between multiple vendors and the enterprise and, for each risk relationship, an electronic record identifier and a set of attribute values;
   (b) the information sharing portal computer server, coupled to the multi-vendor risk relationship data store, including:
      a computer processor, and
      a computer memory, coupled to the computer processor and storing instructions that, when executed by the computer processor, cause the information sharing portal computer server to:
         (i) receive key words and medical codes about an employee during an intake process, wherein the medical code is at least one of an International Statistical Classification of Diseases and Related Health Problems ("ICD") code and a Current Procedures Terminology ("CPT") code;
         (ii) receive an executed form from the employee;
         (iii) automatically attach an electronic file containing a copy of the executed form to a message with an information request;
         (iv) exchange the information request with a remote vendor platform, the information request being associated with a referral recommendation for the employee of a sponsor associated with the vendor platform and wherein the information request is only processed in a case the executed form is attached to the information request which reduces a number of electronic records transmitted via a distributed communication network,
         (v) process the information request via a customized vendor-specific information sharing portal interface display,
         (vi) automatically generate, in response to the information request, a program referral via execution of a referral algorithm of the information sharing portal computer server,
         (vii) execute the algorithm to adjust, based on at least one attribute value retrieved from the multi-vendor risk relationship data store, interactions with the vendor platform via the customized vendor-specific information sharing portal interface display;
   (c) a communication port coupled to the information sharing portal computer server to facilitate an exchange of data with the remote vendor platform to support the customized vendor-specific information sharing portal interface display via security features and the distributed communication network; and
   (d) an email server, coupled to the information sharing portal computer server that receives information from the information sharing portal computer server recommending the employee interact with the referred program and in response to the automatically-generated program referral, the email server auto-generates an email to a contact of the program via a preferred email system.

2. The system of claim 1, wherein the information request is associated with a request for information from a vendor.

3. The system of claim 2, wherein the executed form is associated with at least one of: (i) a medical release, (ii) a universal medical authorization, (iii) secured voice authorization, and (iv) Health Insurance Portability and Accountability Act ("HIPPA") consent.

4. The system of claim 1, wherein the risk relationship is associated with an insurance policy, the sponsor is associated with an employer, and the vendor platform is associated with a medical service provider.

5. The system of claim 4, wherein the insurance policy is associated with at least one of: (i) short term disability, (ii) long term disability, (iii) workers' compensation, (iv) a leave management program, (v) a financial services program, (vi) a vison vendor program, (vii) a disease management program, (viii) an employee assistance program, (ix) a case management program, (x) a life insurance program, (xi) an American Disabilities Act ("ADA") accommodation program, (xii) a behavioral health consulting program, (xiii) a consulting services program, and (xix) a leave management program.

6. The system of claim 1, wherein the information sharing portal computer server is further coupled to a claims processing platform.

7. The system of claim 1, wherein the information sharing portal computer server is further coupled to an intake platform.

8. The system of claim 1, further comprising an aggregated report creation user interface including a report creation and definition area, wherein the aggregated report creation user interface is adapted to generate an aggregated report that displays all of the vendors and activity that transpired between a given vendor and the enterprise.

9. The system of claim 8, wherein the aggregated report includes an aggregated display of vendor data.

10. The system of claim 8, wherein the aggregated report includes program referral trend information.

11. A computerized method to facilitate an exchange of information via an information sharing portal computer server of an enterprise, comprising:
    receiving key words and medical codes about an employee during an intake process, wherein the medical code is at least one of an International Statistical Classification of Diseases and Related Health Problems ("ICD") code and a Current Procedures Terminology ("CPT") code;
    receiving an executed form from the employee;
    automatically attaching an electronic file containing a copy of the executed form to a message with an information request;
    exchanging, by a computer processor at the information sharing portal computer server coupled to an intake platform, the information request with a remote vendor platform, the information request being associated with a referral recommendation for the employee of a sponsor associated with the vendor platform and wherein the information request is only processed in a case the executed form is attached to the information request which reduces a number of electronic records transmitted via a distributed communication network;

accessing a multi-vendor risk relationship data store containing electronic records representing a plurality of risk relationships between multiple vendors and the enterprise and, for each risk relationship, an electronic record identifier and a set of attribute values;

processing the information request via a customized vendor-specific information sharing portal interface display;

automatically generating, in response to the information request, a program referral via execution of a referral algorithm of the information sharing portal computer server;

executing the algorithm to adjust, based on at least one attribute value retrieved from the multi-vendor risk relationship data store, interactions with the vendor platform via the customized vendor-specific information sharing portal interface display;

receiving, at an email server coupled to the information sharing portal computer server, information from the information sharing portal computer server recommending the employee interact with referred program; and in response to the automatically-generated program referral, auto-generating, via the email server, an email to a contact of the program via a preferred email system.

12. The method of claim 11, wherein the information request is associated with a request for information from a vendor.

13. The method of claim 12, wherein the executed form is associated with at least one of: (i) a medical release, (ii) a universal medical authorization, (iii) secured voice authorization, and (iv) Health Insurance Portability and Accountability Act ("HIPPA") consent.

14. The method of claim 11, wherein the risk relationship is associated with an insurance policy, the sponsor is associated with an employer, and the vendor platform is associated with a medical service provider.

15. A non-tangible, computer-readable medium storing instructions, that, when executed by a processor, cause the processor to perform a method to facilitate an exchange of information via an information sharing portal computer server of an enterprise, the method comprising:

receiving key words and medical codes about an employee during an intake process, wherein the medical code is at least one of an International Statistical Classification of Diseases and Related Health Problems ("ICD") code and a Current Procedures Terminology ("CPT") code;

receiving an executed form from the employee;

automatically attaching an electronic file containing a copy of the executed form to a message with an information request;

exchanging, by a computer processor at the information sharing portal computer server coupled to an intake platform, the information request with a remote vendor platform, the information request being associated with a referral recommendation for the employee of a sponsor associated with the vendor platform and wherein the information request is only processed in a case the executed form is attached to the information request which reduces a number of electronic records transmitted via a distributed communication network;

accessing a multi-vendor risk relationship data store containing electronic records representing a plurality of risk relationships between multiple vendors and the enterprise and, for each risk relationship, an electronic record identifier and a set of attribute values;

processing the information request via a customized vendor-specific information sharing portal interface display;

automatically generating, in response to the information request, a program referral via execution of a referral algorithm of the information sharing portal computer server;

executing the algorithm to adjust, based on at least one attribute value retrieved from the multi-vendor risk relationship data store, interactions with the vendor platform via the customized vendor-specific information sharing portal interface display;

receiving, at an email server coupled to the information sharing portal computer server, information from the information sharing portal computer server recommending the employee interact with the referred program; and in response to the automatically-generated program referral, auto-generating, via the email server, an email to a contact of the program via a preferred email system.

16. The medium of claim 15, wherein the risk relationship is associated with an insurance policy, the sponsor is associated with an employer, and the vendor platform is associated with a medical service provider.

17. The medium of claim 16, wherein the insurance policy is associated with at least one of: (i) short term disability, (ii) long term disability, (iii) workers' compensation, (iv) a leave management program, (v) a financial services program, (vi) a vison vendor program, (vii) a disease management program, (viii) an employee assistance program, (ix) a case management program, (x) a life insurance program, (xi) an American Disabilities Act ("ADA") accommodation program, (xii) a behavioral health consulting program, (xiii) a consulting services program, and (xix) a leave management program.

18. The medium of claim 17, wherein the information sharing portal computer server is further coupled to a claims processing platform.

* * * * *